United States Patent
Georgiadis et al.

[11] 3,894,361
[45] July 15, 1975

[54] LENS GRINDING MACHINE

[75] Inventors: Jean Georgiadis, Flushing, N.Y.;
Donald Leibowitz, Trenton, N.J.

[73] Assignee: Dimelp Optical Co. Inc., New York, N.Y.

[22] Filed: Sept. 3, 1974

[21] Appl. No.: 502,520

[52] U.S. Cl. .................................. 51/101 LG
[51] Int. Cl. ..................... B24b 9/14; B24b 17/00
[58] Field of Search ............ 51/101 R, 101 LG, 127

[56] References Cited
UNITED STATES PATENTS

| | | | |
|---|---|---|---|
| 3,332,172 | 7/1967 | Stern | 51/101 LG |
| 3,461,619 | 8/1969 | Hurlbut et al. | 51/101 LG |
| 3,513,598 | 5/1970 | Asselin et al. | 51/101 LG |
| 3,520,091 | 7/1970 | Raphael | 51/101 LG |

FOREIGN PATENTS OR APPLICATIONS

| | | | |
|---|---|---|---|
| 808,329 | 2/1959 | United Kingdom | 51/101 LG |

*Primary Examiner*—Othell M. Simpson
*Attorney, Agent, or Firm*—Hubbell, Cohen and Stiefel

[57] ABSTRACT

A machine for selectively grinding the peripheral edges of both glass lens materials and plastic lens materials to a predetermined size and shape includes an axially shiftable shaft having a rough grinding wheel for rough grinding a glass lens to a rough size and shape corresponding to a first predetermined size and shape, another rough grinding wheel for rough grinding a plastic lens to a rough size and shape corresponding to a second predetermined size and shape and a common bevel edge grinding wheel for finishing either the rough ground plastic lens or the rough ground glass lens. Each of the grinding wheels is coaxially fixedly mounted on the shaft for axial movement therewith and rotational movement thereabout and a work carriage having a rotary lens holder capable of holding either the glass lens or the plastic lens is mounted on a frame for movement toward and away from the grinding wheels with the shaft of the grinding wheels being axially movable to selectively dispose each of the grinding wheels adjacent the held lens for grinding engagement therewith. Alternatively, the plastic lens or glass lens may be selectively disposed to the proper grinding wheel by axially moving the lens in its work carriage and axially fixing the grinding wheels. Movement control means, such as camming means, a linear solenoid in conjunction with camming means, solely linear solenoids, a rotary solenoid in conjunction with camming means or a motor in conjunction with camming means may be utilized for controlling the movement of the lens holder frame and shifting movement of the shaft to bring the edge of the held lens into selective engagement first with the appropriate rough grinding wheel dependent upon whether the held lens is plastic or glass and thereafter with the common bevel edge grinding wheel. A master template controls the engagement of the held lens with the selected grinding wheel selectively adjacent thereto for controlling the shaping of the held lens.

10 Claims, 15 Drawing Figures

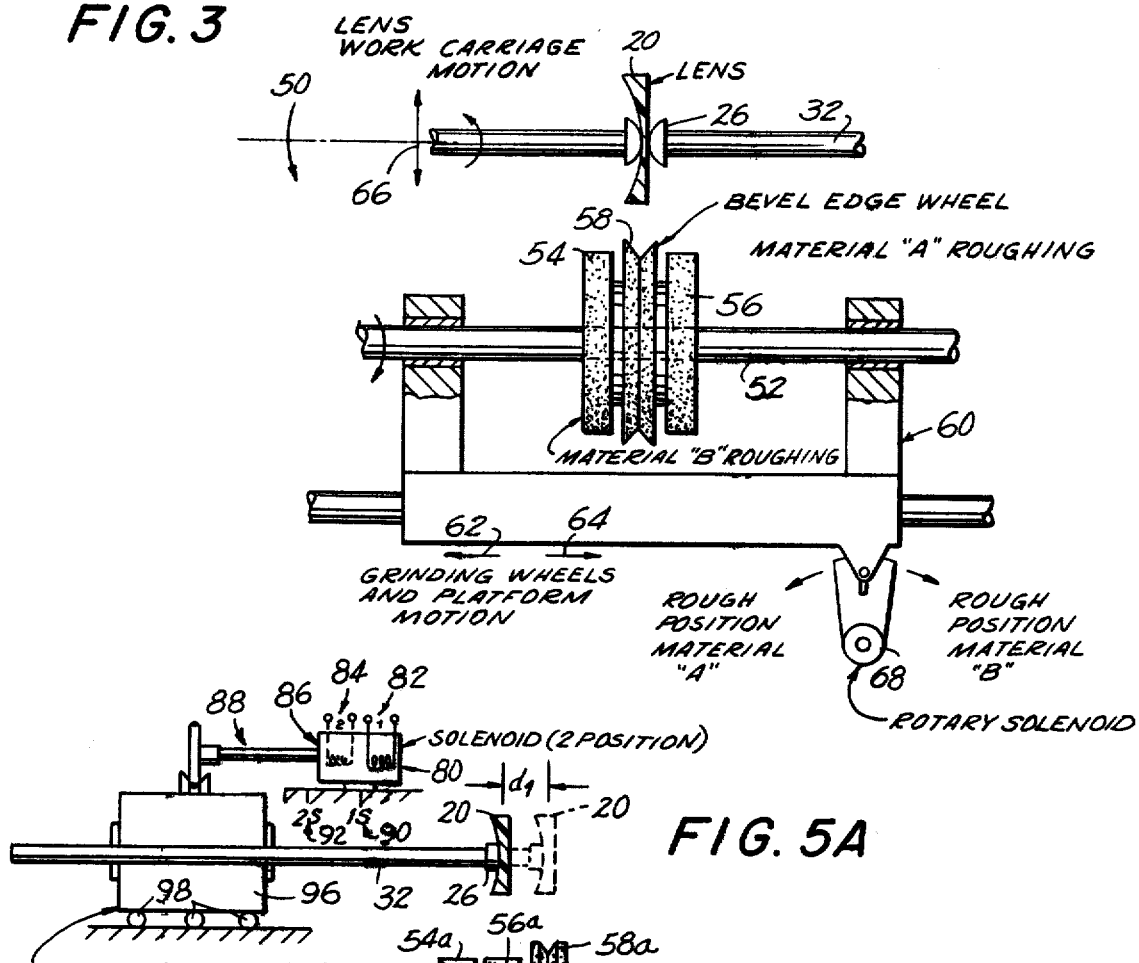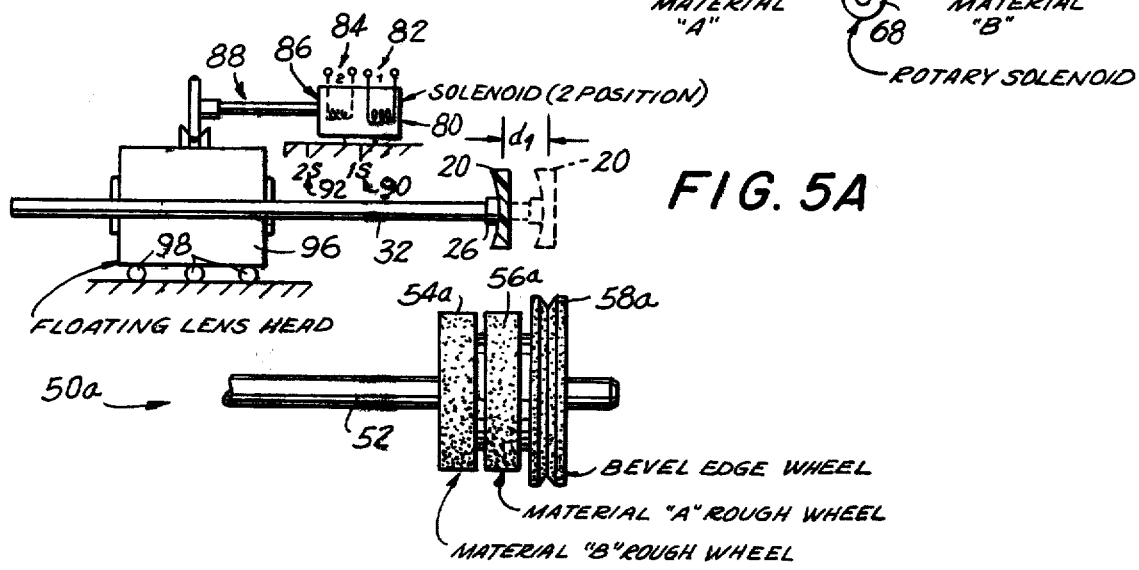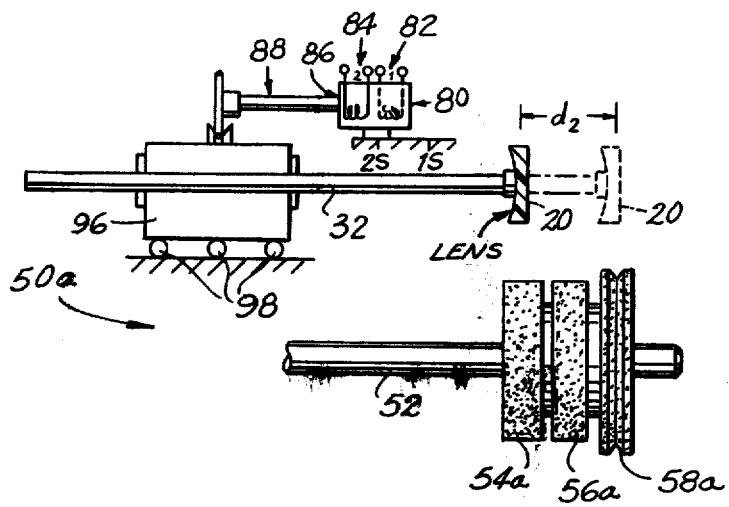

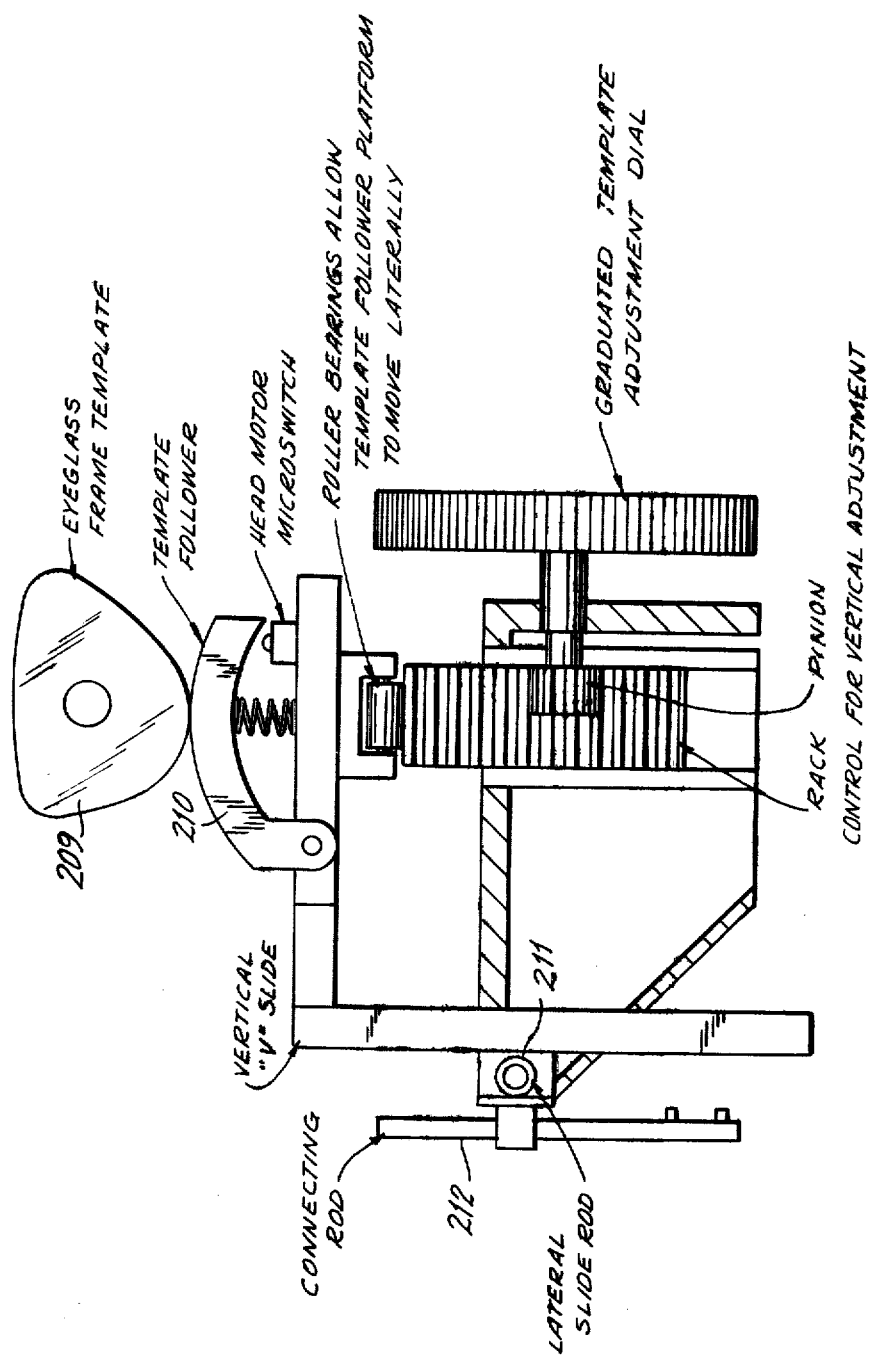

LENS GRINDING MACHINE

BACKGROUND OF THE INVENTION

1. Field of the Invention

The present invention relates to apparatus for forming and sizing lenses to a predetermined outline or edge configuration.

2. Description of the Prior Art

It is well known that it is required to shape opthalmic lenses which are today formed of either glass or plastic to permit them to be fitted into eyeglass frames. Normally, the same individual has responsibility for interchangeably grinding both glass and plastic lenses dependent on the choice of the eyeglass wearer. Wheels that perform the grinding operation are usually diamond impregnated, since most lenses have in the past been glass. Such wheels are costly, and after being used must be dressed with a stone. The introduction of plastic lenses in recent years has created new requirements for the grinding operation since the plastic lens is significantly softer than glass and produces a fine dust when ground with the conventionally utilized diamond impregnated wheel. In addition, it is well known that there is thermal flow of the plastic during the rough grinding operation which results in coating of the diamond surface of the grinding wheel, and, accordingly, results in a shortened life for the diamond impregnated grinding wheel or at least a considerably slower grinding operation when the same wheel is again used for grinding a glass lens. Accordingly, it has not proved satisfactory to utilize the same grinding wheel for grinding both glass and plastic lenses and, accordingly, attempts to overcome this problem have resulted in requiring two separate lens grinding machines, one for plastic lens grinding and the other for glass lens grinding with its inherent increased cost and inefficiency. With respect to the bevel edge grinding operation with respect to lens grinding, the same problems that have occurred in the rough grinding operation are bevel edge present since the amount of grinding required in the beveledge operation is considerably smaller than that required in rough grinding. Thus, there is no perfectly satisfactory single lens gringing machine in which optimum grinding materials can be applied to different lens materials, such as glass and plastic in which optimum speeds of the grinding wheel with different lens materials may be achieved.

It is well known in the prior art with respect to lens grinding machines, particularly automatic edging machines, to utilize an elaborate camming system, such as one disclosed in U.S. Pat. No. 3,332,172; 3,686,792; 2,723,497 or 1,515,681. For example, in a typical prior art automatic edging machine, such as disclosed in U.S. Pat. No. 3,332,172, the cam system is utilized to cycle the lens onto a single rough grinding wheel and lift the lens up and move it over to the bevel edge grinding wheel and down onto the bevel edge grinding wheel. Since the rough grinding wheel and the bevel edge grinding wheel are always a fixed distance apart a single cam, although quite elaborate, is normally utilized. Thus, the use of a cam for moving the lens up and down to the wheel as well as moving the lens from the rough wheel to the finishing wheel has required a very complicated and expensive cam in the prior art systems. These disadvantages of the prior art are overcome by the present invention.

SUMMARY OF THE INVENTION

A machine is provided for selectively grinding the peripheral edges of both glass lens materials and plastic lens materials to a predetermined size and shape. The machine includes an axially shiftable shaft having a rough grinding wheel for rough grinding a glass lens to a rough size and shape corresponding to a first predetermined size and shape, a second rough grinding wheel for rough grinding a plastic lens to a rough size and shape corresponding to a second predetermined size and shape although, if desired, the predetermined size and shape could be identical or different depending on the associated template, and a common bevel edge grinding wheel for finishing either the rough ground plastic lens or the rough ground glass lens with each of the grinding wheels being coaxially fixedly mounted on the shaft for axial movement therewith and rotational movement thereabout. A work carriage is provided having a rotary lens holder capable of holding either the glass lens or the plastic lens with the lens holder being mounted on a frame for movement toward and away from the grinding wheels. The relative position between the grinding wheels and the held lens is axially variable to selectively dispose each of the grinding wheels adjacent the held lens for engagement therewith, such as by axially moving either the grinding wheel shaft, the grinding wheels themselves or the lens carriage to axially vary such relative position. Movement control means such as a dual camming arrangement having a solenoid actuated cam follower, a pure linear solenoid network, a linear solenoid in conjunction with a camming means, a rotary solenoid in conjunction with camming means or a motor in conjunction with camming means are provided for controlling the movement of the lens holder frame and shifting movement of the shaft to bring the edge of the held lens into selective engagement first with the appropriate rough grinding wheel dependent on whether the held lens is plastic or glass and thereafter with the common bevel edge grinding wheel. The shifting movement of the shaft is controlled preferably by either a linear solenoid, a rotary solenoid or motor with the movement of the lens holder being controlled preferably either by linear solenoid or by camming means. A master template controls the engagement of the held lens with the selected grinding wheel selectively adjacent thereto for controlling the shaping of the held lens. A motor is provided for rotatably driving the rotary lens holder and a switch, such as a cammed micro-switch, is operatively connected to the lens holder drive motor and the master template for causing rotation of the held lens and the operation of the movement control means under control of the master template primarily as a function of the finishing to the associated predetermined size of successive portions of the edge of the held lens by either the glass lens rough grinding wheel or the plastic lens rough grinding wheel and the common bevel edge grinding wheel dependent on the lens material whose peripheral edge is being ground.

BRIEF DESCRIPTION OF THE DRAWINGS

FIG. 3 is a fragmentary diagramatic illustration of the presently preferred embodiment of the lens grinding machine of the present invention;

FIGS. 5a and 5b are fragmentary diagramatic illustrations of an alternative embodiment of the lens grinding machine of the present invention.

FIG. 9 is a fragmentary diagramatic illustration of the template follower platform in accordance with FIG. 8.

DETAILED DESCRIPTION OF THE PREFERRED EMBODIMENT

Figure 1:
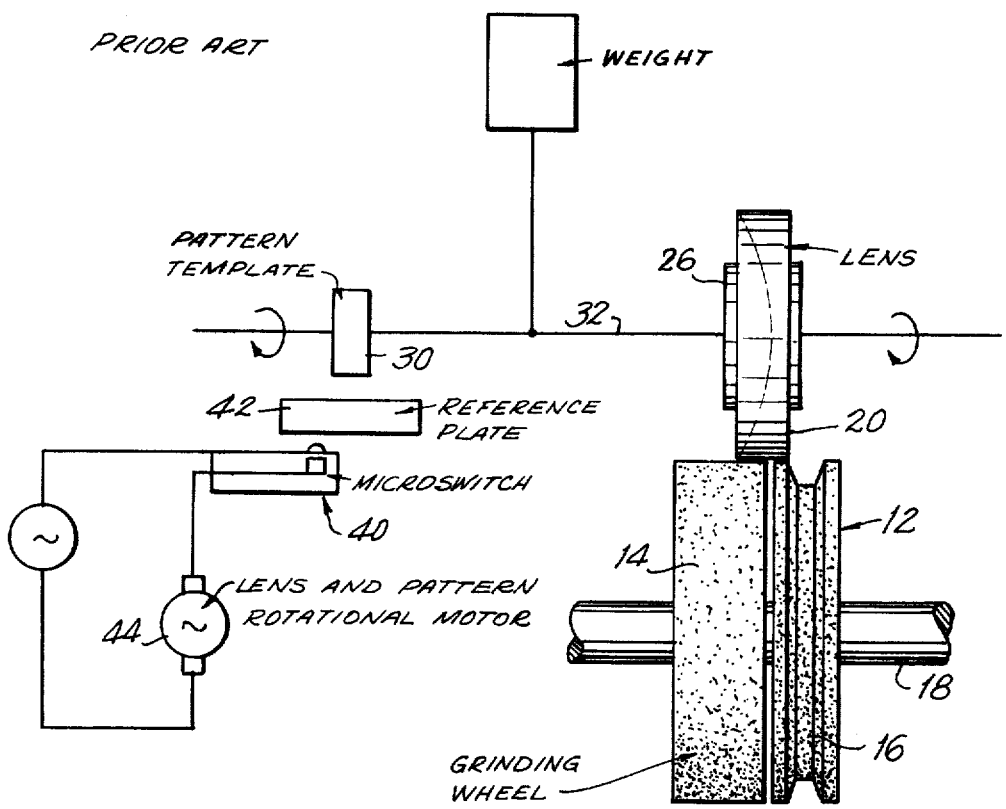
FIG. 1 is a diagramatic illustration of a conventional automatic edging machine lens grinding operation.
Figure 2A:
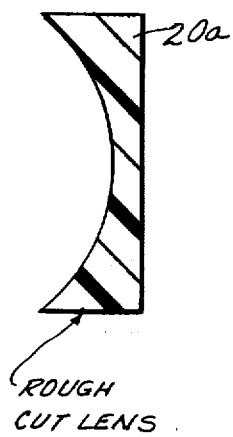
FIGS. 2a, 2b and 2c are a diagramatic illustrations of the lens configurations resulting from conventional lens grinding operations.
Figure 2B:
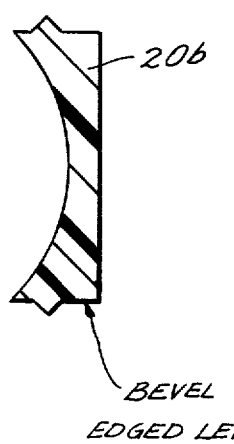
Figure 2C:
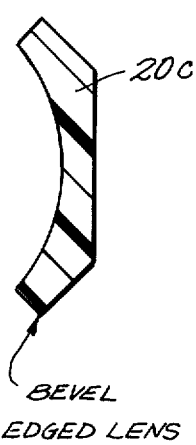
Figure 7:
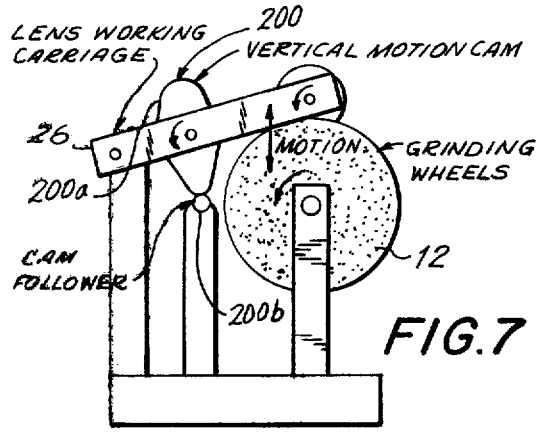
FIG. 7 is a fragmentary diagramatic illustration of the cam arrangement for controlling vertical motion of the work carriage in the lens grinding machine of FIG. 3.
Figure 8:
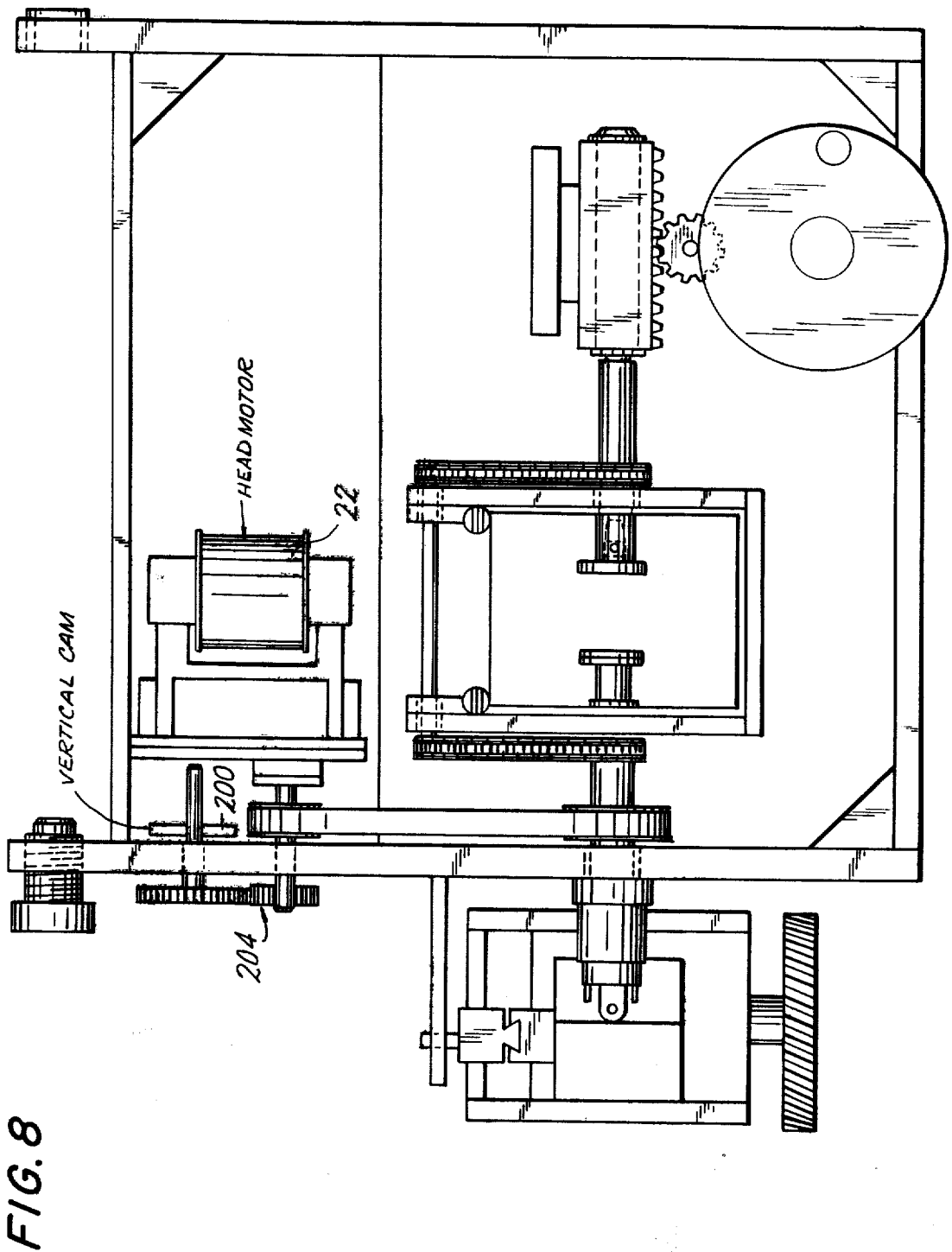
FIG. 8 is a plan view of the presently preferred embodiment of the machine of the present invention in accordance with FIG. 7.

Referring now to the drawings in detail, and initially to FIG. 1 thereof a partial diagramatic illustration of a conventional automatic edging machine, such as the type disclosed in U.S. Pat. No. 3,332,172 which is hereby specifically incorporated by reference herein in its entirety, is shown. It is well known in automatic edging machines, generally referred to by the reference numeral 10, the rotary grinding wheels 12, two such wheels 14 and 16, being shown by way of example mounted side by side on a shaft 18, are both preferably diamond wheels, such as for rough grinding and bevel edge grinding a glass lens. The grinding wheels 14 and 16 are mounted with their peripheries, that is their finishing surfaces, disposed transversely of or in opposition to the edge of the lens 20. The grinding wheels are driven in conventional fashion (not shown), such as by aligned sprockets or by tooth pulleys driven by motor, such as motor 22 illustrated in FIG. 4 or the pulley arrangement 24 also illustrated in FIG. 4 for the embodiment shown in FIG. 4. The lens 20 is normally held in a conventional lens holder, diagramatically illustrated by reference numeral 26, and mounted in a lens holding frame in conventional fashion as described in U.S. Pat. No. 3,332,172, with the lens holder frame being moved towards the grinding wheels 12 to initially engage the lens 20 with the rough grinding wheel, wheel 14 by way of example, by means of a simple vertical motion cam and is then backed away from the rough grinding wheel 14 to accomodate transverse movement of the grinding wheels 12 and shaft 18 to align the bevel edge finishing wheel 16 with the lens 20. Thereafter, the rotary lens holder 26 is again moved toward the grinding wheels 12 to engage the lens with bevel edge finishing wheel 16. The preferred cam 200 that controls vertical motion of the work carriage 26 in the present invention is shown in FIGS. 7 and 8. As will be described in greater detail hereinafter with reference to FIGS. 3 and 4, lateral motion of the grinding wheels 12 is preferably accomplished by means of a rotary solenoid, or motor. Accordingly, the vertical motion cam 200 preferably comprises, a simple disk cam 200a and cam follower 200b rather than a complex cylindrical cam in which the cam follower is required to move parallel to the axis as well as radially. The variation in radial lengths about the disk cam 200a alternately raises or lower the work carriage 26 as the cam disk 200a rotates about its axis, bringing the lens 20 in contact with the proper grinding wheel 12. The rotation of the cam 200a is controlled by head motor 22 through conventional gearing 204. The gearing 204 allows for slower rotation of the vertical cam as compared with the rotation of the lens 20. Head motor 22 rotates the lens 20 by means of a conventional sprocket and chain or timing belt. By utilizing a relatively small gear on the motor 22 shaft and a relatively large gear on the cam 200a shaft, a speed reduction equal to the ratio of the number of teeth on the motor 22 gear to the number of teeth on the cam 200a shaft gear is preferably obtained. The operations performed by such an arrangement are an initial rough grind for purposes of which the rough grinding wheel 14 is normally a rough texture diamond impregnated wheel having a flat periphery and a second bevel edge or finishing grind for which purposes bevel edge grinding wheel 16 is normally a fine textured wheel having a V-groove periphery for forming a bevel on the edge of the lens 20. To guide the lens 20 for formation of a predetermined outline or edge configuration, a master template 30 of the desired outline is afixed to the end of the work holder shaft 32 for cooperation with a pair of conventional template followers 210, such as the type disclosed in U.S. Pat. No. 3,332,172, which are corrolated respectively to grinding wheels 14 and 16. As shown and preferred in FIG. 3, the present invention preferably includes a sliding mechanism 211 in operative engagement with the template followers 210 to bring one template follower that is adjusted for the rough finish grinding operation into position when the lens 20 is in the rough grind operation and automatically to bring the second template follower into position when the lens 20 is in position on the V-groove bevel grind wheel 16. The sliding mechanism 211 permits the templates 210 to be adjusted vertically for master template 209 control. A connecting rod 212 slides the proper template follower 210 under the master template 209 when the proper grinding wheel 12 is engaged. The connecting rod 212 preferably connects the moving platform with the template follower platform. As described in U.S. Pat. No. 3,332,172, the template followers are normally spaced laterally from their respective wheels 14 and 16 by a distance equal to the spacing between the template and the lens 20 whereby one follower would be aligned with the template when the lens was aligned with the rough grinding wheel 14 and the other follower would be aligned with the template when the lens was aligned with the bevel finishing wheel 16. As described in U.S. Pat. No. 3,332,172, each of the followers would preferably comprise a case 62 to a respective part of a micrometer, a microswitch 40 in the case and a depending hinged earplate or reference plate 42 on the front face of the case adapted to be engaged by the template 30. In the instance of two followers, two switches similar to micro-switch 40 but connected in parallel, one switch being provided for each follower, with one another and in series with a drive motor 44 through the work holder whereby the motor 44 is energized and the lens 20 is rotated only when the template 30 engages the reference plate or pad 42 and closes the associated microswitch 40. Consequently, when the rotary work holder 26 is moved to engage lens 20 with either of the grinding wheels 14 or 16, the grinding wheel works to finish the portion of the lens 20 engaged therewith until that portion is ground down sufficiently for the template 30 to engage the plate 42 and close the switch 40 whereupon the motor 44 is energized and rotates the work holder 26 a small increment to bring a fresh portion of the lens 20 against the wheel thereby moving the rotary work holder 26 back and opening the switch 40 until the fresh portion is ground to size where the cycle is repeated. In this manner, successive portions of the lens 20 are ground down to size during incremental advances of the lens 20 until the edge of the lens 20 is ground down to the intended outline, whereupon the lens 20 will rotate continuously. Successive grinding may be prevented in conventional fashion by virtue of a positive stop means provided by the template 30 and the followers. As described with reference to FIG. 1, two grinding operations are normally required, a rough grind operation to cut the lens 20 to the basic shape of the pattern or template and a fine or bevel grinding operation to put a bevel edge on the lens 20 that will permit the lens 20 to be held in the eyeglass frame. FIG. 2a illustrates a rough cut lens provided by the rough grinding operation, such as from grinding wheel 14 and FIGS. 2b and 2c illustrate different types of bevel edged lense which can be provided by the bevel edge grinding operation of the rough cut lens of FIG. 2a such as by wheel 16.

Figure 4:
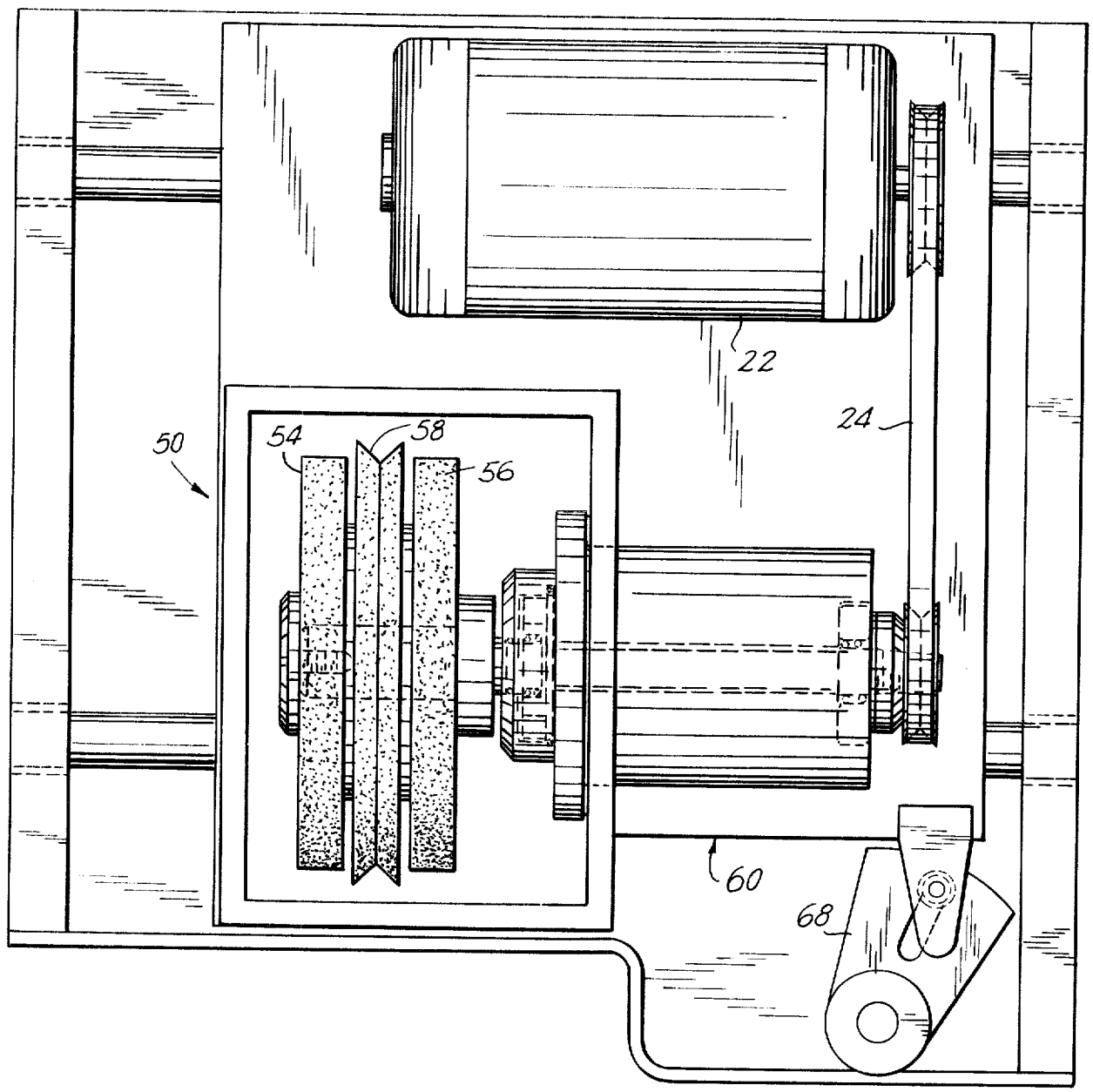
FIG. 4 is a plan view of the presently preferred embodiment of the machine of the present invention in accordance with FIG. 3.

Referring now to FIGS. 3 and 4, the preferred lens grinding machine of the present invention, generally referred to by the reference number 50 is shown. With respect to FIG. 3, conventional portions of the lens grinding machine 50 have been omitted for purposes of clarity and only a fragmentary operational schematic in accordance with the presently preferred embodiment of the present invention is shown. FIG. 4 is a plan view illustration of the relative placement of various other portions of the lens grinding machine 50 of the present invention, but still omitting conventional portions of the lens grinding machine 50, such as conventional portions of the type illustrated and described in U.S. Pat. No. 3,332,172. As is shown and preferred in FIG. 3, three grinding wheels are preferably coaxially fixedly mounted on a common shaft 52 for axial movement therewith and rotational movement thereabout. The grinding wheels preferably comprise a rough grinding wheel for one type of lens material, such as a diamond impregnated wheel 54 for rough grinding glass lenses, a separate rough grinding wheel 56 for rough grinding a different lens material, such as preferably a plastic lens, such as a diamond plated grinding wheel or a carborundum grinding wheel axially spaced apart from grinding wheel 54 and a conventional bevel edge grinding wheel 58 having V-shaped grooves therein which is disposed adjacent to and between rough grinding wheels 54 and 56 and is common thereto. Shaft 52 is preferably rotationally mounted in a common grinding wheel platform 60 for rotational movement therein and axial movement therewith bidirectionally in the directions indicated by arrows 62 and 64. The lens work holder 26 is mounted on work holder shaft 32 and is a rotary work holder, preferably identical with that previously described with reference to FIG. 1, for rotation of shaft 32 about its longitudinal axis with the rotary work holder 26 being mounted in a work carriage for bidirectional motion in the direction of arrow 66 toward and away from the grinding wheels 54, 56 and 58 with the lens 20 being illustratively shown in FIG. 3 as being aligned with bevel edge grinding wheel 58, the rough grinding operation having been completed. As previously described, the cam 200a vertically positions the lens 20 against the grinding wheels 54, 56 and 58 such as by the type of movement described in U.S. Pat. No. 3,332,172, while a conventional rotary solenoid 68 is preferably operatively connected to platform 60 for positioning the proper grinding wheel 54, 56 or 58 under the lens 20. In the arrangement illustrated in FIGS. 3 and 4, the lens work carriage, including rotary work holder 26, is preferably axially fixed in position and the grinding wheels 54, 56 and 58 are axially moved in the direction of arrows 62 and 64 by rotary solenoid 68 to selectively position the appropriate grinding wheel 54, 56 or 58 under the lens 20. As shown in FIG. 3, the bevel edge grinding wheel 58 is placed between the glass rough grinding wheel 54 and the plastic lens rough grinding wheel 56 although, if desired, the bevel edge grinding wheel 58 may be placed on either end of the three wheels with the rough grinding wheels 54 and 56 being directly adjacent to each other. Preferably, the rotary solenoid 68 rotates in one direction through two angles to move the grinding wheel platform 60 and, hence, the appropriate rough grinding wheel 54 or 56 in the furthest position from the bevel wheel 58 under the lens 20. The operational sequence of the arrangement illustrated in FIG. 3 is preferably as follows. The lens 20 lifts by means of the conventional mechanical camming means and the rotary solenoid 68 having an armature and associated coil is energized, as will be further described in greater detail hereinafter, to angularly move to either the first or second angular position dependent upon which rough grinding wheel 54 or 56 had been selected dependent on the lens material, for example glass or plastic, being ground, to position the appropriate rough grinding wheel 54 or 56 under the lens 20. The lens 20 is then cycled through rough grinding 68 by the appropriate template-reference plate-micro-switch arrangement 30-42-40 in a manner similar to that described with reference to FIG. 1. The lens 20 then lifts and the rotary solenoid 68 positions the bevel edge grinding wheel 58 under lens 20. The lens 20 is then cycled through the bevel grinding operation under control of the master template-reference plate-micro-switch arrangement 30-42-40 of the type previously described with reference to FIG. 1. Thereafter, when this operation has been completed, the lens 20 lifts and the machine is stopped. The rotary solenoid motion may be completely duplicated by means of a motor and appropriate limit switches that control the stopping of the motor at the appropriate angles. The rotary solenoid 68 preferably automatically disengages when it reaches the proper angle of rotation and is therefore preferred, however, as previously mentioned, if desired a motor with appropriate limit switches may be used without departing from the present invention. The advantages inherent to the rotary solenoid drive over other machines of this type still apply when using the motor since vertical cam design is still greatly simplified.

Turning to FIGS. 5a and 5b, an alternative embodiment of the preferred embodiment of the lens grinding machine 50a of the present invention shall be described with reference to the partial operational schematic shown therein which, as previously mentioned with reference to FIGS. 3 and 4 the balance of the lens grinding machine 50a being conventional and being omitted for purposes of clarity. The alternative embodiment shown in FIGS. 5a and 5b is a system for transferring lens 20 from the appropriate rough grinding 54a or 56a, depending on the material selected, each grinding wheel 54a and 56a being for a different lens material, such as glass and plastic as previously mentioned with reference to FIG. 3, to the common bevel edging wheel 58a utilizing a conventional two position solenoid 80. The solenoid 80, which is a conventional linear solenoid, preferably utilizes two windings 82 and 84 in the arrangement shown in FIGS. 5a and 5b and has an armature 86 whose current is changed by windings 82 and 84 to change the distance travelled by a plunger 88 associated with the armature 86. The solenoid 80 is preferably axially movable to one of two axial positions 90 or 92, termed the start positions, by a conventional lever arrangement (not shown). The appropriate winding 82 or 84 is selected by means of this lever in conjunction with a conventional rotary wafer switch (not shown). The starting positions 90 and 92 line the lens 20 up with either a glass rough grinding wheel 54a or a plastic rough grinding wheel 56a depending upon whether the lens to be ground is a glass lens material or a plastic lens material. When the edger 50a is started, a conventional mechanical cam (not shown) such as previously mentioned with reference to FIGS. 3 and 4, automatically lowers the lens shaft 32 onto the appropriate rough grinding wheel 54a or 56a and the rough cycle is begin. At the end of the rough cycle, which is governed by the cammed micro-switch arrangement 30-42-40 which was previously described with reference to FIG. 1, the lens shaft 32 is lifted and the solenoid 80 is actuated. The plunger 88 of the solenoid 80 will carry the lens shaft 32 laterally through either $d_1$ (FIG. 5a) or $d_2$ (FIG. 5b) depending upon which position was originally selected in accordance with which type of lens material is being ground, glass or plastic. The micro-switch 40 is preferably located above the bevel edge grinding wheel 58a and starts the bevel edge grinding cycle dropping the lens 20 onto the bevel edge grinding wheel 58a by means of the vertical motion cam (not shown). At the conclusion of the bevel edge grinding cycle the lens shaft 32 is raised, the power is removed from the previously energized solenoid coil 82 or 84 and a spring (not shown) preferably returns the plunger 88 to the start position 90 or 92 permitting another lens 20 of the same material to be ground. If a new lens 20 of a different material, such as glass as opposed to plastic, is to be selected, the solenoid 80 is preferably positioned in the new start position 90 or 92 corresponding to the grinding position for the rough grinding operation associated with the different material and the previously described process is repeated. As shown and preferred in FIGS. 5a and 5b, the lens holding arrangement including the rotary lens holder 26 and the lens shaft 32 is preferably conventionally mounted on a floating lens head arrangement 96 which includes conventional bearings 98 enabling axial movement of the lens shaft 32. FIG. 5a depicts the above described arrangement where the rough grinding operation is accomplished by rough grinding wheel 56a, such as for plastic lenses by way of example, and FIG. 5b depicts the same arrangement where the rough grinding operation is accomplished by rough grinding wheel 54a such as for glass lenses, with the operation being identical except for selection of the initial starting position and the solenoid winding selected to provide a linear movement of $d_2$ verses a linear movement of $d_1$.

If desired, instead of the mechanical camming means associated with the arrangement of FIGS. 5a and 5b effecting vertical motion of the lens shaft 32 toward and away from the lens grinding wheels 54a, 56a and 58a, a linear solenoid similar to solenoid 80 could be utilized in the vertical direction to accomplish such lifting or translation with all of the solenoids being controlled by micro-switches programmed by an automatic controller, and with the lifting motion being accomplished by a linear solenoid attached to the machine frame, the frame being preferably constructed to provide a large moment at the point of solenoid action and with a stable holding position being designed to keep the head from falling in this position thus damaging the lens 20. All of the solenoids in such a system could be actuated by the template arrangement 30-42-40 previously described with reference to FIG. 1 to permit the solenoid sequence to follow the lens grinding action instead of having to depend upon a timing sequence.

Figure 6:
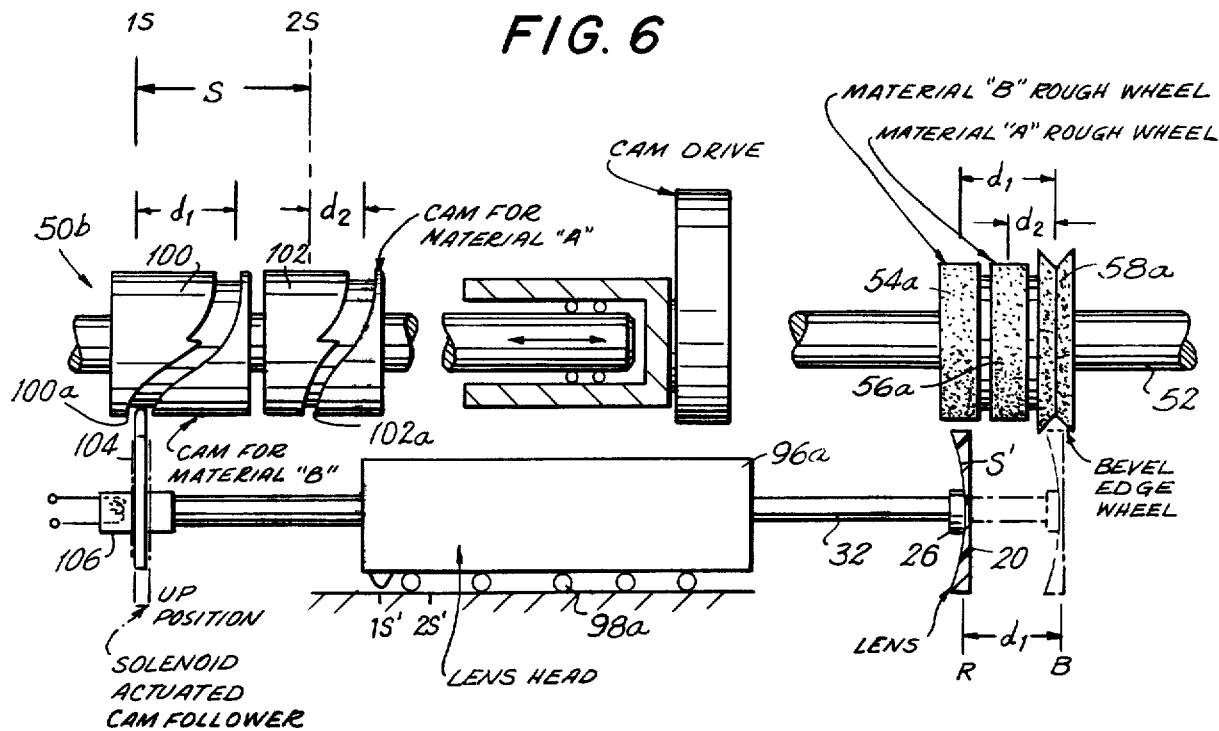
FIG. 6 is a fragmentary diagramatic illustration of another alternative embodiment of the lens grinding machine of the present invention.

Referring now to FIG. 6, another alternative embodiment 50b of the lens grinding machine of the present invention is shown with all conventional portions of the lens grinding machine 50b being omitted for purposes of clarity as was the case in FIGS. 3 and 4 and FIGS. 5a and 5b previously described. The arrangement illustrated in FIG. 6 is a dual cam system utilizing cams 100 and 102 with, by way of example, cam 100 corresponding to the operation of the lens grinding machine 50b with respect to a glass lens material and with cam 102 corresponding to the operation of the lens grinding machine 50b with respect to a plastic lens material. Utilizing the double camming arrangement 100–102 FIG. 6 the sequence of operations may be performed to permit using either the rough grinding wheel 54a associated with the glass lens grinding or the rough grinding wheel 56a associated with the plastic lens grinding in accordance with cam 100 or cam 102, respectively. As shown and preferred in FIG. 6, a cam follower 104 drives a conventional lens head 96a which is a floating lens head such as on bearings 98a and follows the program designed by the cam as illustratively shown by grooves 100a and 102a, respectively. A follower 104 is preferably solenoid actuated by a solenoid 106 in either the up (out of cam position) or down (in cam position). A dial (not shown) preferably automatically permits the proper lineup of the cam follower 104 with lens 20 of the appropriate rough grinding wheel 54a or 56a and also actuates the solenoid 106 so that the cam follower 104 engages the proper cam 100 or 102 when in the start position. The sequence of operation is as follows. The cam follower 104 starts in the up position indicated by the dotted lines in FIG. 6 out of the cam, cam follower 104 being shown adjacent cam 100, by way of example, in FIG. 6. The cam 100, by way of example, and lens head 96a are positioned in positions $1s$ and $1s'$ or $2s$ and $2s'$ depending upon on whether cam 100 is to be engaged or cam 102 is to be engaged, respectively, to drive grinding wheel 54a or 56a, respectively. The cam follower 104 is then dropped into the proper cam 100 or 102 with which it is now aligned. The rough grind cycle then begins with the cam follower engaging track 100a in the example shown in FIG. 6. After a programmed number of rough grind turns the lens head 96a lifts and travels either a distance $d_1$ or $d_2$ depending upon whether the rough grinding wheel which was accomplishing the rough grind cycle was wheel 54a or 56a, respectively. The shifting between the rough grind wheel and the bevel grind wheel is in accordance with the programmed cam operation prescribed by the appropriate track 100a or 102a in which cam follower 104 rides during the operational sequence. When the lens head has travelled the appropriate distance $d_1$ or $d_1$ the lens engages the bevel edge grinding wheel 58a as shown by the dotted lines in FIG. 6 and the bevel grind cycle begins. After the bevel grind cycle has been completed, the lens head 96a returns to the start position of either 1s or 2s. Variations of this dual camming control system may be accomplished in the spirit and scope of the present invention such as by utilizing a dual cam follower arrangement where one cam follower is 180° out of phase with the other, in other words one cam follower is up while the other one is down. In such an instance, the only additional starting motion required is to position the lens in the proper position over the proper grinding wheel, the cam performance still being identical with that previously described. As shown and preferred in FIG. 6, preferably cams 100 and 102 are identical in design with the primary difference being the distances $d_1$ and $d_2$ respectively, between the beginning and the end of the respective tracks 100a and 102a, as shown in FIG. 6.

Figure 10A:
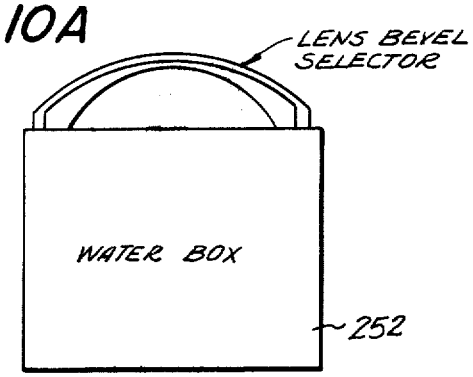
FIGS. 10a, 10b and 10c are diagramatic illustrations of a preferred embodiment of a lens bevel selector for use with the machine of FIG. 3.
Figure 10B:
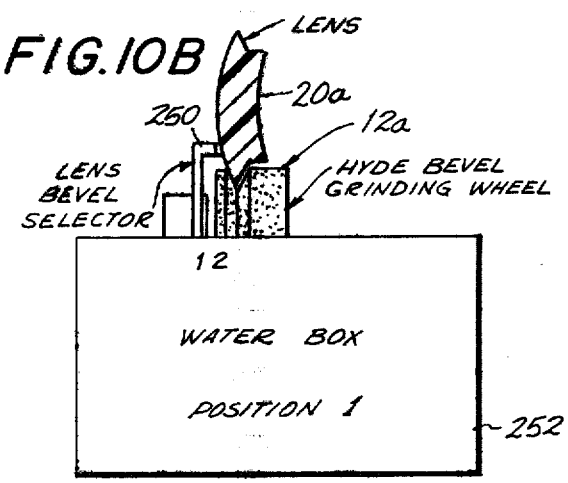
Figure 10C:
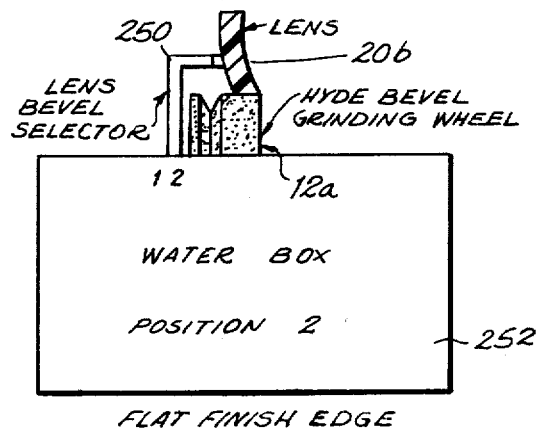

Referring now to FIGS. 10a, 10b and 10c, a preferred embodiment of a lens bevel selector 250 for use with the lens grinding machine 10 of the present invention is shown. The selector 250 is preferably utilized at the discretion of the user of machine 10 where it is desired to permit edging a thick lens for frames that do not have channels. When a thick lens 20a is edged, position 1 shown in FIG. 10b is preferably selected and the selector 250 is preferably manually inserted into holes placed in a conventional water box 252 so as to span the box 252 perpendicularly to the grinding wheel 12 axis. The selector 250 is preferably composed of a metal frame and a plastic or hard rubber edge, although any other equivalent materials may be utilized. The plastic edge of the selector 250 limits the movement of the lens 20a as it programs automatically into the fine bevel grinding wheel. In this manner the bevel edge is placed only along the conves region of the lens 20a leaving a flat circumferentially at the concave section as shown in FIG. 10b. If a V-edge is not desired, the plastic edge of the selector 250 preferably covers the V in the Hyde bevel fine wheel 12a as shown in FIG. 10c.

Utilizing the present invention, different grinding wheels having different characteristics and/or different costs may be selected dependent on the relative usage so as to maximize the efficiency of the machine while minimizing the expenses thereof.

It is to be understood that the above described embodiments of the invention are merely illustrative of the principles thereof and that numerous modifications and embodiments of the invention may be derived within the spirit and scope thereof, such as by utilizing more than two grinding wheels up to any desired number thereof with the appropriate modifications to the lens translating system and/or by utilizing more than bevel edge grinding wheel with appropriate modifications.

What is claimed is:

1. A machine for selectively grinding the peripheral edges of both glass lens materials and plastic lens materials to a predetermined size and shape comprising a first axial shiftable shaft means having a first rough grinding wheel for rough grinding a glass lens to a rough size and shape corresponding to a first predetermined size and shape, a second rough grinding wheel for rough grinding a plastic lens to a rough size and shape corresponding to a second predetermined size and shape, and a first common bevel edge grinding wheel for finishing either said rough ground plastic lens or said rough ground glass lens, each of said grinding wheels being mounted on said first shaft for axial movement therewith and rotational movement thereabout, a work carriage having a rotary lens holder capable of holding either said glass lens or said plastic lens, said lens holder being mounted on a frame for movement toward and away from said grinding wheels, said first shaft being axially movable to selectively dispose each of said grinding wheels adjacent said held lens for grinding engagement therewith, movement control means for controlling said movement of the lens holder frame and shifting movement of said first shaft to bring the edge of the held lens into selective engagement first with the appropriate rough grinding wheel dependent on whether said held lens is plastic or glass and thereafter with said common bevel edge grinding wheel, a master template means for controlling the engagement of the held lens with the selected grinding wheel selectively adjacent thereto for controlling the shaping of said held lens, drive means for rotatably driving said rotary lens holder, and switch means operatively connected to said lens holder drive means and said master template means for causing rotation of said held lens and the operation of said movement control means under control of said master template means primarily as a function of the finishing to the associated predetermined size of successive portions of the edge of said held lens by either said glass lens rough grinding wheel or said plastic lens rough grinding wheel and said common bevel edge grinding wheel dependent on the lens material whose peripheral edge is being ground.

2. A machine in accordance with claim 1, wherein said glass lens rough grinding wheel comprises a diamond impregnated grinding wheel in which impregnated diamonds protrude beyond the surface of said wheel and said plastic lens rough grinding wheel comprises a diamond plated grinding wheel.

3. A machine in accordance with claim 1, wherein said glass lens rough grinding wheel comprises a diamond impregnated grinding wheel in which impregnated diamonds protrude beyond the surface of the wheel and said plastic lens rough grinding wheel comprises a carborundum wheel.

4. A machine in accordance with claim 1, wherein said movement control means comprises an axially movable multipositional solenoid means for controlling axial shifting movement of said first shaft, said axially movable first shaft having a first position in which the selected rough grinding wheel is adjacent said held lens for rough grinding thereby and a second position in which the common bevel edge grinding wheel is adjacent said held lens for bevel edge grinding thereby, said solenoid means having an axially movable armature means and a coil means for effecting axial movement of said armature means between an axially selectable starting position and a first position or a second position, said axially movable armature means causing said axial movement of said first shaft from said first position to said second position, said first shaft being in said first position in accordance with the axially selected starting position of said armature means and being axially moved to said second position in response to movement of said armature means to either said first or second position thereof dependent on the lens material being ground and the axial movement required to move said first shaft from alignment of the held lens with the appropriate selected rough grinding wheel to alignment of the held lens with the common bevel edge grinding wheel; and means for moving said lens holder away from engagement of said held lens with said appropriate selected rough grinding wheel prior to said first shaft axial movement to said second position thereof and toward engagement of said held lens with said common bevel edge grinding wheel after said first shaft axial movement to said second position thereof.

5. A machine in accordance with claim 4, wherein said movement control means further comprises means for selectively axially moving said solenoid means between a first starting position corresponding to alignment of said held lens with said glass rough grinding wheel and a second starting position corresponding to alignment of said held lens with said plastic rough grinding wheel, said armature means being axially movable to said first position from said first starting position and to said second position from said second starting position.

6. A machine in accordance with claim 4, wherein lens holder moving means comprises camming means.

7. A machine in accordance with claim 1, wherein said movement control means comprises first camming means for controlling said movement for grinding a glass lens and second camming means for controlling said movement for grinding a plastic lens, and axially movable solenoid controlled cam follower means axially movable between a first and second axial position for selectively engaging said cam follower means with either said first or second camming means dependent on the lens material being ground.

8. A machine in accordance with claim 1, wherein said movement control means comprises solenoid means for effecting both said lens holder movement and said first shaft axial movement.

9. A machine in accordance with claim 1, wherein said movement control means comprises a rotary solenoid means for controlling axial shifting movement of said first shaft said axially movable first shaft having a first position in which the selected rough grinding wheel is adjacent said held lens for rough grinding thereby and a second position in which the common bevel edge grinding wheel is adjacent said held lens for bevel edge grinding thereby, said solenoid means having an angularly movable armature means and a coil means for effecting angular movement of said armature means between an initial starting position and a first angular position or a second angular position, said angularly movable armature means being operatively connected to said first shaft for causing said axial movement of said first shaft from said first position to said second position, said first shaft being moved from said first position to said second position in response to angular movement of said armature means to either said first or second angular position therof dependent on the lens material being ground; and means for moving said lens holder away from engagement of said held lens with said appropriate selected rough grinding wheel prior to said first shaft axial movement to said second position thereof and toward engagement of said held lens with said common bevel edge grinding wheel after said first shaft axial movement to said second position thereof.

10. A machine in accordance with claim 9, wherein said lens holder moving means comprises camming means.

* * * * *

PO-1050
(5/69)

UNITED STATES PATENT OFFICE
CERTIFICATE OF CORRECTION

Patent No. 3,894,361  Dated July 15, 1975

Inventor(s) Jean GEORGIADIS and Donald LEIBOWITZ

It is certified that error appears in the above-identified patent and that said Letters Patent are hereby corrected as shown below:

Column 1, line 42: "bevel edge present" should read -- not present --; line 43: "beveledge" should read -- bevel edge --; line 45: "gringing" should read -- grinding --.

Column 2, line 66: "2a, 2b and 2c are a" should read -- 2a, 2b and 2c are --.

Column 4, line 6: "lower" should read -- lowers --.

Column 7, line 33: "is begin" should read -- is begun --.

Column 8, line 62: "upon on" should read -- upon --.

Column 9, line 47: "conves" should read -- convex --.

Signed and Sealed this twenty-fifth Day of November 1975

[SEAL]

Attest:

RUTH C. MASON
*Attesting Officer*

C. MARSHALL DANN
*Commissioner of Patents and Trademarks*